United States Patent [19]

Grimsby

[11] Patent Number: 4,457,869
[45] Date of Patent: Jul. 3, 1984

[54] OILSEED EXTRACTION PROCESS

[75] Inventor: Frank N. Grimsby, Houston, Tex.

[73] Assignee: Shell Oil Company, Houston, Tex.

[21] Appl. No.: 376,085

[22] Filed: May 7, 1982

[51] Int. Cl.$^3$ ............................. C07F 5/02; C11B 1/00
[52] U.S. Cl. ................................................. 260/412.4
[58] Field of Search ..................................... 260/412.4

[56] References Cited

U.S. PATENT DOCUMENTS 4,009,290 2/1977 Okumori et al. ................. 260/412.4
4,298,540 11/1981 Youn et al. ....................... 260/412.4

OTHER PUBLICATIONS

Harris et al., J. Am. Oil Chem. Soc., vol. 24, pp. 370–375 (1947).
Harris et al., J. Am. Oil Chem. Soc., vol. 26, pp. 719–723 (1949).
Harris et al., J. Am. Oil Chem. Soc., vol. 27, pp. 273–275 (1950).
Jongeneelen, J. Am. Oil Chem. Soc., vol. 53, pp. 291–292 (1976).

Primary Examiner—Helen M. S. Sneed

[57] ABSTRACT

A process for the extraction of oilseeds which comprises steps for extracting oil from oilseeds by contacting the seeds with an isopropanol-based solvent in an extractor to obtain an extract miscella of seedoils in solvent and a seed meal containing absorbed liquids, cooling and phase-separating the miscella to recover solvent, mechanically draining at least a portion of the absorbed liquids from the meal, evaporating residual solvent from the drained meal, and recycling drained liquids to the extractor as solvent.

6 Claims, 1 Drawing Figure

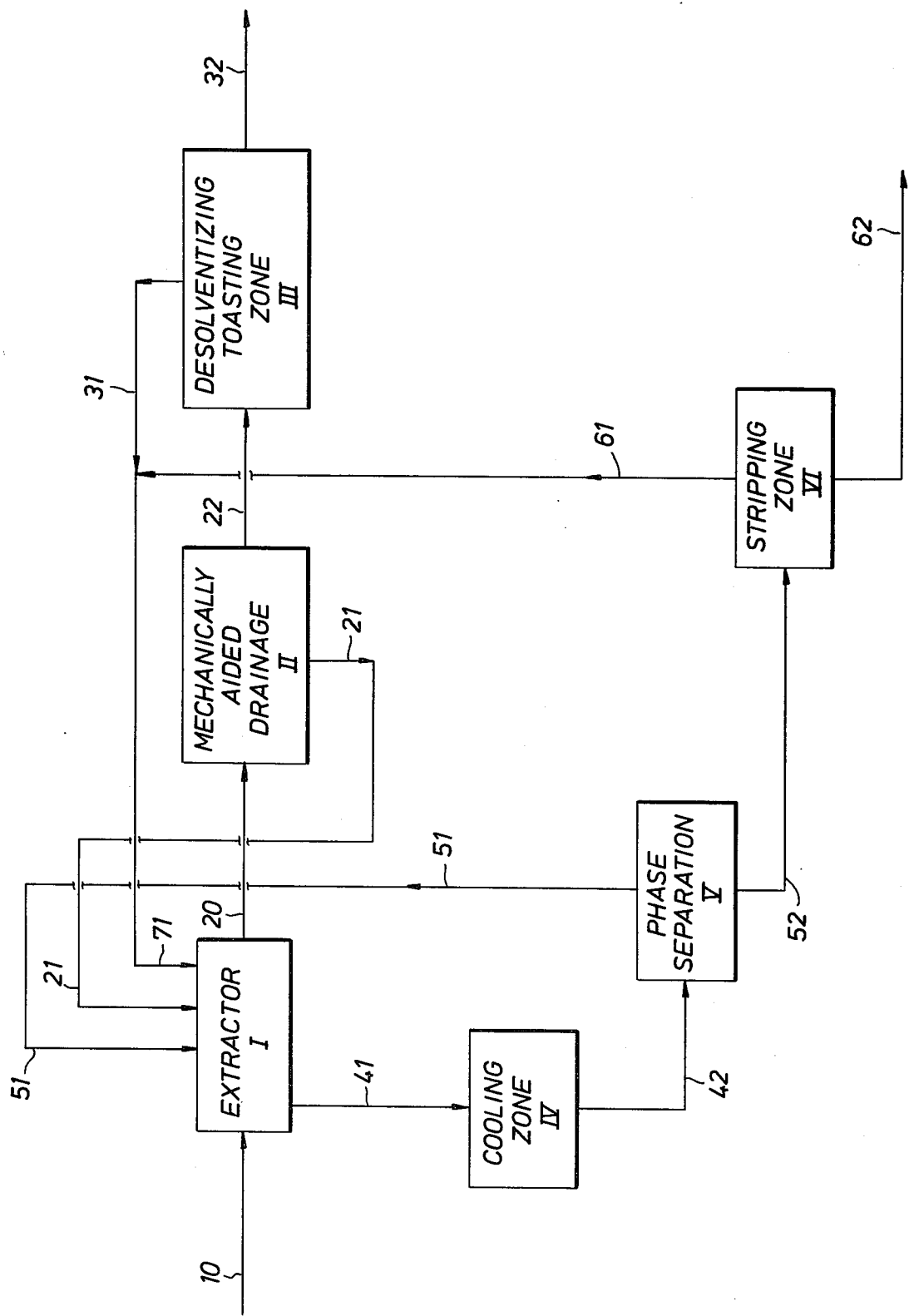

OILSEED EXTRACTION PROCESS

BACKGROUND OF THE INVENTION

The present invention relates to an improvement in the processing of oilseeds such as, for example, soybean, cottonseed, corn, peanut, safflower, sunflower, and palm. More particularly, the invention relates to an improved process for the extraction of oils from oilseeds utilizing an isopropyl alcohol-based extraction solvent.

The oilseed industry of the United States produces on an annual basis about thirteen million tons of seed oils from roughly one billion bushels of seed crops, predominantly soybean and cottonseed. Essentially all of this oil is recovered from the seeds by solvent extraction. The oils find primary use in foods, e.g., shortening, margarine, cooking oils, and salad oils, while seed meal from which the oil has been extracted, having a high protein content, is generally processed into animal feeds. About two percent of this meal is further refined for human consumption.

In the recovery of seed oils, the industry consumes large quantities of extraction solvent. Hexane has long been recognized as the standard solvent in the industry, due in part to its low cost relative to other solvents and in part to its physical and chemical properties. However, in recent years incentive has developed for the replacement of hexane as the solvent of choice for oilseed extraction. Increasing hexane costs and possibilities of supply shortages account for some of this incentive. In addition, for health and safety reasons, solvent specifications in the industry, precautions to prevent exposure of workers to hexane, and relevant hydrocarbon emission standards may be tightened. Furthermore, interest in producing an upgraded seed meal, for instance a meal suitable for human consumption without the need for secondary extraction or other refining, has given rise to attempts at use of alternate extraction solvents.

Of particular relevance to the present invention is the prior art relating to extraction of oilseeds with an isopropanol-based solvent. Characteristics of isopropanol extraction are generally well known and are described, for instance, by Harris et al in a three-part publication entitled "Isopropanol as a Solvent for Extraction of Cottonseed Oil" (J. Am. Oil Chem. Soc., November 1947, Vol. 24, p. 370-375; December 1949, Vol. 26, p. 719-723; and July 1950, Vol. 27, p. 273-275). More recent developments in oilseed processing with isopropanol are outlined by Youn and Wilpers in U.S. Pat. No. 4,298,540.

It is recognized that, although isopropanol is in many respects attractive for use as an oilseed extractant, it cannot as a practical matter be directly substituted in a process designed for use of a hexane solvent. Direct substitution would, for example, entail substantial increases in process energy requirements. Under conventional hexane extraction processing, solvent is recovered from both the oil and meal products by evaporation. However, because energy necessary for this evaporation is a major factor in processing costs, because the heat of vaporization of an isopropanol-water azeotrope is nearly three times that of hexane, and because isopropanol extraction typically requires greater quantities of solvent than hexane extraction, it is not economically feasible to practice a like evaporation of isopropanol-based solvent. The above-referenced publications of Harris et al describe a method for phase separating solvent and extracted oil in the extraction process miscella which has advantages in energy conservation over evaporative separation. However, these publications do not address aspects of the problem relating to the energy intensive separation of solvent from extracted meal.

It is an object of this invention to enhance the energy efficiency of solvent recovery in an oilseed extraction process utilizing an isopropanol-based solvent. It is a further object of the invention to improve the efficiency of the extraction of oils from oilseeds.

In most general terms, for realization of these objects the present invention relies in part upon a mechanically-aided drainage of solvent from oilseed meal following extraction of the seeds with an isopropanol-based solvent. The prior art is not known to have considered such drainage for liquid removal from meals extracted with isopropanol-based extraction solvents. For conventional extraction processes utilizing a hexane solvent, it has been observed (H. P. J. Jongeneelen, J. Am. Oil Chemists' Soc., June 1976 (Vol. 53), pp. 291-292) that liquid hold-up in the meal can be reduced by gravity drainage or pressing. However, it is at the same time observed that drainage of liquid from the meal in hexane processing has a drawback from the standpoint energy utilization and process integration. It is suggested that mechanical drainage of solvent, as opposed to gravity drainage, which is generally conducted within the conventional extraction, is of no advantage to the extraction process unless practiced in conjunction with special provisions for the distillative separation of solvent from extracted oil. Such considerations of distillative separation do not apply in isopropanol solvent extraction processes in which solvent is separated from oil primarily by phase separation rather than by distillation. In other aspects, the invention relates to criticalities in the degree of solvent drainage from the meal and to particular routings of process flows.

SUMMARY OF THE INVENTION

The present invention can be summarily described as an improvement applicable to processes having steps for contacting oilseeds with an isopropanol-based solvent to obtain a liquid miscella and a meal, recovering solvent from the miscella by cooling and phase separating, and recovering solvent from the meal by evaporation, said improvement comprising process steps for mechanically-draining liquid from the meal before it is subjected to solvent evaporation and recycling the drained liquid to the extractor as isopropanol-based solvent. Mechanically-aided drainage of the meal is suitably accomplished, for example, by means of a press, a rolling mill, a filter or a centrifuge.

In certain preferred aspects of the invention, the process employs a multi-stage, countercurrent extractor. Both the solvent recovered from the miscella by phase-separation and the liquid recovered from the meal by mechanical drainage are recycled to the extractor, with the liquid recovered by mechanical drainage being introduced at an extractor stage upstream with respect to movement of the oilseeds (and downstream with respect to flow of solvent) from the stage at which the solvent recovered by phase-separation is introduced.

In another preferred aspect, at least about half of the liquid hold-up in the meal from the extractor is separated therefrom during mechanical drainage.

DESCRIPTION OF THE DRAWING

The invention is further illustrated in the attached drawing, which depicts in a single FIGURE a simplified schematic flow diagram of a particularly preferred embodiment. It is to be understood that the drawing omits a detailed showing of equipment, instrumentation, piping, valving, etc., which would be used in practicing the process, as such matters will be apparent to those skilled in the relevant processing arts. It should also be understood that while the embodiment of the invention shown in the drawing is characterized by continuous process operation, the invention can similarly be operated in a batch or continuous mode.

Referring to the drawing, a process feed stream designated 10 consists of the meats of oilseeds, for example, soybeans, which are introduced into an extractor, represented by the Roman numeral I. Prior to extraction, the oilseeds have preferably been treated under conventional practices which include, for instance, steps for flaking of the meats and adjusting their water content. Also introduced into the extractor are one or more isopropanol solvent streams, here three streams designated 21, 51, and 71. Through contact with solvent in the extractor, oils, water, free fatty acids, carbohydrates and other substances are extracted from the seeds to produce a meal 20 which is withdrawn from the extractor and, in accordance with the invention, introduced into a processing zone II for conduct of a mechanically-aided drainage step. Meal 20 leaves the extractor with a high adsorbed liquid content. In zone II mechanical means are applied to force a substantial portion of the adsorbed liquid from the meal. A drained liquid stream is collected and withdrawn from zone II via line 21. Meal having substantially reduced liquid hold-up is withdrawn from the mechanically-aided drainage zone via line 22 and introduced into a desolventizing zone III. In zone III, heat is applied to evaporate substantially all of the residual solvent in the meal. Evaporated solvent is condensed and withdrawn via line 31. A product meal is withdrawn via line 32 from zone III.

Contact of seeds and solvent in zone I also produces an extract solution or miscella 41 containing solvent and oils and other seed extracts. In the process of the invention, this miscella is cooled in a cooling zone IV and the cooled miscella 42 is then subjected to phase separation in zone V. Phase separation yields an upper solvent-rich phase, which is withdrawn via line 51, and a lower crude oil-rich phase which is routed via line 52 to a stripping zone VI. In the stripping zone, the oil is freed of substantially all of the residual isopropanol solvent by evaporation or distillation. Recovered solvent vapors are condensed and withdrawn via line 61. The process oil product is withdrawn as stream 62.

Solvent-containing streams 21, 31, 51, and 61 are recycled to the extractor. Under preferred optional aspects of the invention, the extractor has multiple contact stages through which process solids (seeds/meal) and liquids (solvent/extract) are passed countercurrently. Preferably, recycle streams are returned to the several extractor stages in a particular order. Thus, the liquid 21 recovered from the meal by mechanically-aided drainage in zone II is recycled as solvent to the extractor at a stage upstream with respect to liquid flow (and downstream with respect to the movement of solids) from that to which the solvent phase separated from oil in zone V is recycled via line 51. More preferably, stream 21 is also introduced to the extractor at a stage downstream with respect to liquid flow from the stage(s) to which the solvent recycle streams 31 and 61 (optionally combined to a single stream 71) are introduced.

DESCRIPTION OF THE PREFERRED EMBODIMENTS

The invention is applicable to the processing of a wide variety of oilseed crops, including but not limited to soybean, cottonseed, corn, peanut, safflower, sunflower, and palm. Soybean and cottonseed oil extraction processes are of particular interest.

The process of the invention is limited in its applicability to oilseed extractions which employ an isopropanol-based solvent. It is known that isopropanol-based solvents may comprise in minor amount, i.e., less than about 20 percent by weight (calculated on isopropanol), other solvent materials, e.g., ethanol or acetone, having substantial solubility for seedoils. Such solvent mixtures are suitable for use in the invention, provided they yield an extract from which solvent may be effectively recovered by phase separation. Preferably the isopropanol-based solvent utilized in the invention is substantially free of these other materials. The isopropanol-based solvent does, however, typically comprise water in a relative quantity about equal to or greater than that in the 88 percent by weight (%w) isopropanol and 12%w water azeotrope, although the specific content of water in the solvent is not critical to the invention. Depending on the specific provisions of the process for solvent recycle and solvent make-up, the average water content of all extraction solvent streams is normally between about 1 and 25%w calculated on the total of isopropanol and water, preferably between about 8 and 20%w, and most preferably between about 12 and 20%w. The process of the invention is not intended for application to oilseed extractions which employ hexane-based solvents.

The invention is further specifically limited in its applicability to isopropanol-based solvent extraction processes in which the miscella extract is cooled and phase-separated into solvent-rich and oil-rich components, particularly to processes in which greater than about 50%, preferably greater than about 75%, and more preferably greater than about 90% of the solvent contained in the extractor miscella is removed therefrom by phase-separation.

The step for contact in the extractor of isopropanol-based solvent with oilseeds in the process of the invention is suitably carried out employing conventional equipment and procedures well known in the oilseed extraction art, including those heretofore utilized in hexane solvent processes. Very importantly, the suitability of such conventional equipment simplifies adaptation of existing hexane extraction plants to the use of isopropanol. Multi-stage, countercurrent extractors are particularly preferred.

For best performance, the extraction step of the invention employs somewhat different processing conditions than does the hexane extraction process. For instance, since the solubility of the oils in isopropanol-based solvents is temperature dependent, it is desirable to operate the extractor at a temperature which approaches the solvent boiling point. Thus, for example, in extraction under atmospheric pressure using an isopropanol-water azeotrope as solvent, an extraction temperature near the azeotrope boiling point of 176° F., for instance, a temperature in the range of about 160° to 176° F., is preferred. As a rule, the isopropanol process is preferably conducted in a greater quantity of solvent, relative to the quantity of seed, than does hexane processing, for example, about 1.5 to 6 pounds of solvent per pound of seeds, preferably about 2 to 4 pounds of solvent per pound of seeds.

The miscella phase-separation is likewise very suitably conducted in accordance with the teachings of the prior art on isopropanol extraction. Temperature dependence of the oil solubility in the solvent calls for a relatively low phase separation temperature. Miscella from the extractor is preferably cooled to a temperature between about 30° and 100° F., most preferably between about 40° and 80° F. At these temperatures, an acceptable phase separation is typically accomplished in about 20 minutes to 2 hours. Coalesers or the like may be used to reduce phase-separation times. Matters of both extractor operation with an isopropanol solvent and phase-separation of the resulting miscella and recovery of solvent from meal and oil products are more thoroughly described in the publications and patent on the subject hereinabove cited, and also in the copending, commonly assigned application of F. N. Grimsby, Ser. No. 376,086 filed on even date herewith, the teachings of each of which on these points are incorporated herein by reference.

Following its separation from the miscella, the solvent phase is recycled to the extractor. Phase separated oil commonly contains about 5 to 20%w solvent, which may be recovered by evaporation or distillation (stripping).

For purposes of the invention, meal exiting the extractor is subjected to a process step for mechanically-aided drainage of adsorbed liquids. Mechanically-aided drainage is to be distinguished from gravity drainage by the application to the seeds of forces other than that of gravity to squeeze or draw liquid from the meal. (Gravity drainage is typically practiced in oilseed extraction processes, particularly in a final stage of the extractor from which liquid is withdrawn but into which no extraction solvent is introduced. The present invention optionally comprises a gravity drainage step in addition to the specified mechanically-aided drainage step.) Examples of suitable means, one or more of which may be applied for accomplishing the required mechanically-aided drainage, include a screw-press or expeller, a rolling mill, a plate press, a rotary filter, and a centrifuge. Screwpress, rolling mill, and plate vacuum filters generally requires cooling of the meal to prevent flashing of isopropanol.

It has been found that adherence or absorbtivity of isopropanol solvent-containing liquids on the meal is greater than that of hexane solvent-containing liquids. However, mechanically-aided drainage is effective to substantially lessen the liquid hold-up of the meal. For example, liquid, i.e., solvent and solvent extractibles, content of the meal can be reduced from about 50%w as withdrawn from the extractor (and after a gravity drainage) to a preferred value of less than about 30%w, and, if desired, to a more preferred level of less than about 25%w or a most preferred value of about 15-20%w. Unlike hexane processing, the overall process energy savings associated with the mechanical drainage are directly proportional to the degree of liquid hold-up in the meal. There is, under practice of the invention, a clear incentive for accomplishing, via mechanically-aided drainage, a reduction in liquid hold-up beyond that which can be achieved with gravity drainage alone.

In addition to advantages in energy utilization, the process step for mechanical drainage may provide an enhanced degree of oil recovery from the seed. Lower solubility of the isopropanol-based solvents for seedoils under certain processing conditions (for example at relatively low extraction temperatures) may lead to a higher oil content in meal leaving the isopropanol solvent extraction than has been the case with conventional hexane processes. Separation of absorbed liquids from meal by evaporation alone, as in the hexane process, does not recover oil retained by the meal. Through mechanical drainage of oil-containing liquid, a substantial proportion of such retained oil is, however, recovered under the invention. Such recovery is useful in compensating for such effects of the lower solubility of isopropanol solvents for oil and in bringing the recovery of oil in the overall process of the invention to a level comparable to or greater than that realized in the conventional hexane extraction process.

Liquid recovered from the meal by mechanical drainage is, in the process of the invention recycled to the extractor as extraction solvent. Unlike the hexane extraction process of the Jongeneelen publication, which treats drained liquid as extraction miscella, such a routing of recovered liquid has been found to enhance the overall efficiency of the process of the invention, both with respect to energy utilization and oil separation from the seeds. In preferred process embodiments employing multiple-stage, countercurrent extractors, the liquid recovered by mechanical drainage means is introduced to the extractor at a stage downstream with respect to the flow of solvent from the stage at which solvent recovered from miscella by phase separation is introduced. It is further preferred that the stage of the introduction of such mechanically drained liquid be upstream (with respect to solvent flow) of the extractor stage to which solvent recovered from the drained meal by evaporation is introduced.

Following the mechanically-aided drainage, meal is subjected to desolventizing and toasting. As in conventional practice, desolventizing and toasting may be carried out in a single process step, using equipment and procedures well known in the art. Typically, the meal is contacted with live steam and/or otherwise heated. Isopropanol is evaporated and the vapors condensed to recover solvent for recycle to the extractor. Toasting of the meal refers to desired changes in the meal brought about through the steam contact and/or heating, including reductions in the meal's natural content of urease and trypsin inhibitor which are necessary, for instance, if the meal is to be used for cattle feed.

Since, in the practice of the process of the invention the solvent content of the meal has been substantially reduced by mechanically-aided drainage, a less severe desolventizing operation is required providing a potential for energy (heat and/or steam) and processing time savings. However, full advantage cannot be taken of such potential if reduced quantities of steam and heat were not at the same time sufficient to satisfy the requirements of the process for adequate toasting of the meal. Very advantageously, it has been observed that, in comparison to conventional hexane processing, isopropanol solvent extraction in accordance with the invention produces a meal which prior to toasting contains substantially lower quantities of trypsin inhibitor and urease. As a result, little toasting of the meal is required, and this factor taken together with the meal's lower content of adsorbed solvent provide the desired opportunity for energy savings.

For further illustration, one particular process embodiment in accordance with the invention is described in the following example.

EXAMPLE

Again referring to the drawing for description of a representative continuous process embodiment of the invention on a typical commercial scale, about 41.7 tons per hour of soybean feedstock (approximately 29.2 tons meal components (dry basis), 8.2 tons oil, 0.0 tons isopropanol and 4.3 tons water) is introduced to a multistage countercurrent extractor I via line 10. Contact of the soybeans with about 130.9 tons per hour of total isopropanol-based solvent in the extractor yields about 60.8 tons per hour of wet meal (29.2 tons meal (dry basis), 1.0 tons residual oil, 23.1 tons isopropanol, and 4.3 tons water) which is withdrawn as stream 20 and about 111.8 tons per hour of miscella (0.0 tons meal (dry basis), 13.1 tons oil, 86.8 tons isopropanol, and 11.9 tons water) which is withdrawn as stream 41. Wet meal 20 is introduced into the mechanically-aided drainage zone II. One or more screw presses are applied in zone II to force from the wet meal about 24 tons per hour of absorbed liquids (0.0 tons meal (dry basis), 0.8 tons oil, 20.4 tons isopropanol, and 2.8 tons water). The drained liquids are recycled as solvent stream 21 to the extractor. About 36.8 tons per hour of drained meal (29.2 tons meal (dry basis), 0.2 tons oil, 2.7 tons isopropanol, and 4.7 tons water) is withdrawn from zone II as stream 22 and introduced into desolventizing/toasting zone III. Evaporation of solvent in zone III provides a recycle stream 31 containing about 2.7 tons per hour of isopropanol and about 0.4 tons per hour of water.

The 111.8 tons per hour of miscella in stream 41 are cooled from the extractor temperature of about 174° F. to about 46° F. in coolng zone IV. The cooled miscella stream 42 is then phase-separated in zone V to produce about 102.7 tons per hour of a solvent-rich phase (0.0 tons meal (dry basis), 5.1 tons oil, 85.8 tons isopropanol, and 11.8 tons water) and about 9.1 tons per hour of an oil-rich phase (0.0 tons meal (dry basis), 8.0 tons oil, 1.0 tons isopropanol, and 0.1 tons water). The solvent-rich phase is recycled via line 51 to the extractor, while the oil-rich phase is passed as stream 52 to the stripping zone VI. In the stripping zone, stream 52 is heated to evaporate or distill about 1.1 tons per hour of solvent (1.0 tons isopropanol, 0.1 tons water). About 8.0 tons per hour of essentially solvent-free oil is withdrawn from zone VI via line 62. The evaporated solvent vapor is condensed and recycled to the extractor as stream 61, here shown as combined with stream 31 into stream 71. Solvent recycle stream 51 from zone V is introduced into the extractor at a stage upstream (with respect to movement of seeds) from that to which solvent recycle stream 21 from zone II is introduced, which in turn is upstream from that to which stream 71 from zones III and VI is introduced.

I claim as my invention:

1. In a process for the recovery of oils from seeds containing extractible oils, comprising steps for contacting the seeds with an isopropanol-based extraction solvent in an extractor to obtain a miscella extract of seedoil and solvent and a seed meal containing absorbed extraction liquid, cooling and phase-separating the miscella to recover solvent, and recovering solvent from the meal by evaporation, the improvement which comprises steps for mechanically draining at least a portion of the absorbed liquid from the meal prior to recovering solvent from the meal by evaporation, and recycling the drained liquid to the extractor as isopropanol-based solvent.

2. The process of claim 1, wherein the contact of seeds with extraction solvent is conducted in a multistage countercurrent extractor, the solvent recovered from the meal by evaporation is condensed and recycled to one or more stages of the extractor, and the drained liquid is recycled to one or more stages of the extractor upstream with respect to solvent flow from one or more of the stages to which condensed solvent recovered from the meal by evaporation is recycled.

3. The process of claim 2, wherein the meal is mechanically drained to a content of remaining absorbed liquid that is less than about 30 percent by weight, calculated on total weight of meal and remaining adsorbed liquid.

4. The process of claim 3, wherein the meal is mechanically drained by pressing in a screw press, rolling mill or plate press.

5. The process of either claim 2, claim 3 or claim 4, wherein the meal is mechanically drained to a content of remaining absorbed liquid that is less than about 25 percent by weight, calculated on total weight of meal and remaining adsorbed liquid.

6. The process of claim 5, wherein the meal is mechanically drained to a content of remaining adsorbed liquid that is between about 15 and 20 percent by weight, calculated on total weight of meal and remaining absorbed liquid.

* * * * *